United States Patent [19]

Klima et al.

[11] Patent Number: 4,976,979
[45] Date of Patent: Dec. 11, 1990

[54] PROCESS FOR THE DECAFFEINATION OF TEA

[75] Inventors: Hubertus Klima, Tacherting; Erwin Schütz, Palling; Heinz-Rüdiger Vollbrecht, Stein/Traun, all of Fed. Rep. of Germany

[73] Assignee: SKW Trostberg Aktiengesellschaft, Trostberg, Fed. Rep. of Germany

[21] Appl. No.: 326,510

[22] Filed: Mar. 20, 1989

Related U.S. Application Data

[63] Continuation of Ser. No. 96,757, Sep. 11, 1987, abandoned, which is a continuation of Ser. No. 858,350, May 1, 1986, abandoned.

[30] Foreign Application Priority Data

May 2, 1985 [DE] Fed. Rep. of Germany ....... 3515740

[51] Int. Cl.$^5$ ................................................. A23F 3/36
[52] U.S. Cl. .................................... 426/427; 426/481
[58] Field of Search ................................. 426/427, 481

[56] References Cited

U.S. PATENT DOCUMENTS 2,198,859  4/1940  Bürgin .
a4,247,570  1/1981  Zosel ................................. 426/427 X
4,364,965  12/1982  van der Stegen et al. .
4,411,923  10/1985  Hubert et al. ........................ 426/427

FOREIGN PATENT DOCUMENTS 0140061  5/1985  European Pat. Off. .
0159724  10/1985  European Pat. Off. .
3413869  10/1985  Fed. Rep. of Germany .
3415844  10/1985  Fed. Rep. of Germany .
2360260  3/1978  France .
2408607  6/1979  France .

*Primary Examiner*—Joseph Golian
*Attorney, Agent, or Firm*—Felfe & Lynch

[57] ABSTRACT

The present invention provides a process for the decaffeination of tea containing 15 to 50% by weight of water with moist carbon dioxide at 255 to 350 bar at 50° to 80° C. in a pressure vessel, subsequent separation of the caffeine from the carbon dioxide with the help of an adsorbent and recycling the caffeine-free carbon dioxide over the already extracted tea, wherein the adsorbent is distributed in the material to be extracted in an amount of from 5 to 40% by weight, referred to the dry weight of the tea.

13 Claims, No Drawings

PROCESS FOR THE DECAFFEINATION OF TEA

This application is a continuation, of application Ser. No. 096,757, filed Sept. 11, 1987 which is a continuation of application Ser. No. 858,350 filed May 1, 1986 both applications being abandoned.

The present invention is concerned with a process for the decaffeination of tea with the help of supercritical gases and especially of carbon dioxide.

Various processes have already been described for the removal of caffeine from tea. Thus, for example, it is known to extract caffeine from tea with organic solvents. A disadvantage of this method is its low selectivity, i.e. apart form the caffeine, still important flavourings are also removed at the same time. Furthermore, the complete removal of the solvent is difficult and can scarcely be achieved technically.

Therefore, instead of organic solvents, attempts have been made to use supercritical gases as extraction agents. Thus, for example, in Federal Republic of Germany Patent Specification No. 21 27 642, there is described a two-stage process for the decaffeination of tea in which the aroma materials are first removed with dry supercritical carbon dioxide, subsequently the caffeine is extracted with moist supercritical carbon dioxide and, after again drying the tea, the aroma separated off in the first extraction step is again reimpregnated into the tea.

An important disadvantage of this process is the two-stage method of operation which is technically very laborious and necessitates high investment and operational costs. Furthermore, the separation of the caffeine by depressurising is problematical from the economic point of view since subsequently considerable energy must be expended in order again to bring the carbon dioxide to the supercritical range.

Therefore, in order to overcome this problem, according to Federal Republic of Germany Patent Specification No. 26 37 197, the attempt has been made to remove the caffeine from the carbon dioxide in the supercritical range with the help of ion exchangers. However, in this way, it is not possible to avoid the two-stage extraction.

It first became possible to decaffeinate tea in one step with the help of the process according to Federal Republic of Germany Patent Specification No. 34 15 844. This is achieved by extracting tea with a moisture content of 15 to 50% by weight with moist carbon dioxide at 260 to 350 bar and up to 70° C., again to remove the caffeine from the caffeine-containing carbon dioxide in the same pressure range with active carbon and thereafter to recycle the caffeine-free carbon dioxide over the already extracted tea and to separate the tea from the carbon dioxide and to dry the tea.

The only disadvantage of this process is that the extraction times are relatively long and the amounts of carbon dioxide to be used are relatively large.

Therefore, it is an object of the present invention to improve the process for decaffeinating tea according to Federal Republic of Germany Offenlegungsschrift No. 34 15 844 and to provide a process which does not suffer from its disadvantages.

Thus, according to the present invention, there is provided a process for the decaffeination of tea by extracting tea containing 15 to 50% by weight of water with moist carbon dioxide at 255 to 350 bar and at 50° to 80° C., subsequent separating the caffeine from the carbon dioxide with the help of an adsorbent and recycling the caffeine-free carbon dioxide over the already extracted tea, wherein the adsorbent, especially active carbon, is distributed in the material to be extracted in an amount of from 5 to 40% by weight, referred to the dry weight of the tea.

Surprisingly, we have found that, with the help of the process according to the present invention, the extraction times for a definite degree of decaffeination can be drastically shortened or the amount of carbon dioxide to be employed can be considerably reduced. Furthermore, tea produced in this manner practically does not differ at all with regard to flavour, aroma and color from tea in which the extraction of the caffeine and the separation of the caffeine by means of an adsorbent have been carried out spatially separated.

According to the present invention, the adsorbent is distributed in the material to be extracted in an amount of from 5 to 40% by weight, referred to the dry weight of the tea. In the case of using less than 5% by weight of adsorbent, the adsorption of the caffeine into the adsorbent is insufficient and, consequently, the extracted tea has an undesirably high final caffeine content. The use of more than 40% by weight of adsorbent is uneconomic since, with more than 40% by weight of adsorbent, a substantially higher degree of adsorption is not achieved. On the other hand, the excess adsorbent only represents ballast material which then takes up unnecessary space in the extraction autoclave.

As adsorbent, it is preferred to use active carbon but other adsorption agents, for example ion exchangers, kieselguhr, silicagel, zeolites and active clays, can also be used.

The uniform distribution of the adsorbent in the material to be extracted can be carried out in several different technical ways.

The simplest possibility is uniformly to mix the tea, before introduction into the pressure vessel, with the adsorbent, for which purpose there can be used the conventional technical devices.

Furthermore, it is possible to fill the pressure vessel in layers, the vessel being alternatingly supplied with tea and adsorbent.

In the case of both embodiments, it has proved to be advantageous again to pass the stream of carbon dioxide through a purely adsorbent packing before it leaves the pressure vessel in order that any caffeine possibly present is removed from the gas stream.

It is obvious that, in the case of these process variants, after the extraction, the adsorbent must again be separated off from the decaffeinated tea. This can take place by means of the usual methods of separation, such as cyclone separation, air sifting, sieve classification and electrofiltration. In order hereby to achieve an optimum separation, it is preferred that the grain size of the adsorbent differs distinctly from the particle size of the tea employed. This is normally the case when the adsorbent has a relatively large grain diameter. On the other hand, with increasing grain size, the specific surface area decreases, which has a negative effect on the adsorption action. Therefore, the preferred average grain size range is from 0.1 to 10 mm.

In order to simplify the subsequent separation of the tea from the adsorbent, within the scope of the present invention, it is also possible to cover the adsorbent with such materials through which the carbon dioxide stream can flow unhindered but, on the other hand, a release of the adsorbent into the extraction chamber is prevented. The adsorbent can, for example, be filled into containers which permit a flowthrough of the carbon dioxide stream by means of appropriate sieves or openings. These containers can either be fixedly incorporated into the pressure vessels and be filled or emptied by means of appropriate devices before and after the extraction or can be uniformly distributed in the packing in the case of filling the pressure vessel with tea.

According to another embodiment, the adsorbent can be enveloped with textile material. It can be packed into bags, sacks or tubes and distributed uniformly within the material to be extracted or introduced therein in the form of layers. The only thing of importance is that the mesh size of the fabric is large enough to permit the unhindered entry and emergence of the carbon dioxide gas but is smaller than the particle diameter of the adsorbent in order to prevent a release thereof.

A further embodiment consists in enveloping the adsorbent with a porous inorganic carrier material, for example porous clay or porous graphite, which admittedly enables the contact of the gas with the active carbon but not the contact of the tea with the adsorbent, for example active carbon.

The process according to the present invention can be used not only with axial but also with radial flowthrough of the pressure vessel with supercritical gases. The only thing which must thereby be observed is that the containers possibly filled with adsorbent are optimally arranged in the packing material. For a decaffeination of tea with the process according to the present invention, it is sufficient to extract for 1 to 4 hours.

In using the process according to the present invention, the amount of carbon dioxide can be considerably reduced. Preferably, for the extraction, 0.1 to 3 kg of carbon dioxide are used per g of caffeine to be removed from the tea.

With the help of the extraction process according to the present invention, it is possible to carry out the decaffeination process much more economically. Due to the shorter extraction times of 1 to 4 hours and the use of relatively small amounts of carbon dioxide, substantially higher throughputs can be achieved. Furthermore, the apparatus expense is very small since the extraction and the adsorption of the caffeine can be carried out in one apparatus, for which reason this process is especially suitable for use on a large scale.

The following Examples are given for the purpose of illustrating the present invention:

EXAMPLE 1.

4 kg of a commercially available black tea mixture with a caffeine content of 2.9% are mixed with 10% by weight of active carbon (grain diameter 1-3 mm) and moistened with 40% by weight of water. The mixture is placed into a cylindrical extraction vessel and subsequently extracted with moist, supercritical carbon dioxide at 260 bar and at 63° C. for 2 hours (throughput of the carbon dioxide gas: 200 kg/hour). After separating the tea from the active carbon coal by air sifting, the tea is dried. The caffeine content of the tea is 0.48%, which corresponds to a degree of extraction of 83.5%.

EXAMPLE 2.

8 kg of the same tea mixture are mixed with 25% by weight of active carbon of the same granulation and moistened with 40% by weight of water. The extraction is carried out analogously to Example 1 but with half the carbon dioxide throughput and with an extraction time of 1 hour. After separation of the mixture and drying the tea, there is determined a caffeine content of 0.21% (degree of extraction 92.8%). By increasing the proportion of active carbon, the decaffeination time is halved with a better result being obtained and the specific carbon dioxide consumption (referred to the weight of the tea) is, at the same time, reduced to one eighth.

In exchanging the active carbon by a somewhat higher amount of ion exchanger or adsorption resins analogous results were received under equal conditions.

We claim:

1. A process for the selective decaffeination of tea, comprising distributing in the tea, a charcoal adsorbing means operable to remove caffeine from solution in carbon dioxide; adjusting the moisture content of the tea to 15 to 50% by weight of water; extracting the tea containing 15 to 50% by weight of water in a single step with moist carbon dioxide at 255 to 350 bar and at 50° to 80° C. in a pressure vessel thereby to extract the caffeine into the carbon dioxide and remove the caffeine from the carbon dioxide into the adsorbent; and recycling the caffeine-free carbon dioxide over the already extracted tea and separating the carbon dioxide from the tea essentially without removing flavor, color or aroma from the tea.

2. The process of claim 1, wherein the adsorbing means is active carbon used in an amount of 5 to 40% by weight referred to the dry weight of the tea.

3. The process of claim 1, wherein the adsorbing means is homogeneously mixed with the tea before being placed into the pressure vessel.

4. The process of claim 1, wherein the adsorbing means is distributed by filling the pressure vessel with alternating layers of the tea and adsorbing means.

5. The process of claim 1 further comprising passing the stream of carbon dioxide through a pure adsorbent packing and thereafter removing the carbon dioxide from the pressure vessel for further use.

6. The process of claim 1 wherein said adsorbing means is an adsorbent with a grain size of from 0.1 to 10 mm.

7. The process of claim 7 further comprising separating the adsorbent from the tea after the extraction by means of cyclone separation, air sifting, sieve classification or electrofiltration.

8. The process of claim 6 wherein the adsorbent is enveloped with gas-permeable material.

9. The process of claim 8, wherein the adsorbent is used filled into bags, sacks or tubes of textile material.

10. The process of claim 8, wherein the adsorbent is enveloped in porous clay or porous graphite.

11. The process of claim 1 wherein the carbon dioxide flows through the pressure vessel in the axial or radial direction.

12. The process of claim 1 wherein extraction is carried out for from 1 to 4 hours.

13. The process of claim 1 wherein 0.1 to 3 kg of carbon dioxide are used per gram of caffeine to be removed from the tea.

* * * * *

UNITED STATES PATENT AND TRADEMARK OFFICE
CERTIFICATE OF CORRECTION

PATENT NO. : 4,976,979

DATED : December 11, 1990

INVENTOR(S) : Hubertus Klima, et al.

It is certified that error appears in the above-identified patent and that said Letters Patent is hereby corrected as shown below:

Col. 4, line 47,
  Claim 7, line 1:        change "claim 7" to -- claim 6 --.

Signed and Sealed this

Fifteenth Day of December, 1992

*Attest:*

DOUGLAS B. COMER

*Attesting Officer*      *Acting Commissioner of Patents and Trademarks*